United States Patent [19]
Kelly et al.

[11] Patent Number: 6,047,292
[45] Date of Patent: *Apr. 4, 2000

[54] DIGITALLY ENCODED RECORDING MEDIUM

[75] Inventors: Robert L. Kelly; Keith A. Fredericks, both of New York, N.Y.

[73] Assignee: CDKnet, L.L.C., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/713,237

[22] Filed: Sep. 12, 1996

[51] Int. Cl.[7] .................................................. G06F 17/30
[52] U.S. Cl. ........................ 707/104; 707/10; 709/217; 709/227; 709/229
[58] Field of Search .................................. 707/100–104; 369/272–274, 275.1–275.4; 709/224, 227–229

[56] References Cited

U.S. PATENT DOCUMENTS

| | | | |
|---|---|---|---|
| 5,617,384 | 4/1997 | Yonemitsu et al. | 369/32 |
| 5,619,636 | 4/1997 | Sweat et al. | 345/433 |
| 5,627,936 | 5/1997 | Prasad et al. | 386/96 |
| 5,661,715 | 8/1997 | Blaukovitsch | 369/275.4 |
| 5,832,171 | 11/1998 | Heist | 386/46 |

*Primary Examiner*—Hosain T. Alam
*Attorney, Agent, or Firm*—Cooper & Dunham LLP; Robert D. Katz

[57] ABSTRACT

A digital rotary recording medium includes at least an audio component, an audio video component, and an application. The application component contains at least a browser or application program function. The information is deposited on the rotary digital recording media so that there are disparate audio and audio/video components and applications thereon. The rotary recording medium allows the user to access each element, by selection via an icon-based screen viewed function where one can interact with a pointing or touch device to chose the individual icon.

28 Claims, 11 Drawing Sheets

DIGITALLY ENCODED RECORDING MEDIUM

FIELD OF THE INVENTION

The present invention generally relates to a digital rotary recording medium, and more particularly to a digital rotary recording medium of a heightened functionality having at least an audio sector, an audio and video sector and at least an application program like a browser and residing so that said multiple functions are accessible and switchable.

BACKGROUND OF THE INVENTION

With the advent of the compact disc format, storage which far exceeds the capacity of cassette tape or the floppy disc was made available to a wide audience. In the record industry, the introduction of the compact disc revolutionized the industry and heralded a new format. The vinyl long-playing record fell into obsolescence and CDs as they are commonly referred to are the existing standard for pre-recorded music.

Given the storage capacity that the CD provides, most software manufacturers are slowly phasing out floppy discs in favor of CDs for the sale of their proprietary software. The CD is inexpensive, extremely durable, and retains an impressive storage capacity. Moreover, CD-ROM drives have become standard equipment in the configuration of most personal computers. Therefore, there has been a tremendous amount of interest in identifying new uses or new products for CD format. In addition, given the facility for utilizing recordable CD-ROM and the dramatic decline in price the CD format appears to be inherently the universal medium.

Hence, a rotary recording medium like a compact disc on which a digitally encoded information signal including an audio and/or a video signal, may be used in various applications. The disc may be used in an application where it is required to arbitrarily select an audio selection featuring audio content from among a plurality of audio selections, as in the case of CD records capturing the musical performances of popular recording artists. As an alternative, the user may elect to view a video program, or utilize an application provided by a software purveyor for an activity such as word processing or video game playing. Finally, with the rise of the Web or Internet, many users utilize a browsing utility to access information via the Net.

Unfortunately the CD's capacity is not unlimited. When used for a single undertaking like audio storage or video gaming, the disc which is used as a storage media, can accommodate most applications. For example, a CD may be used for simulating a game or for playing a sport, by using the CD's inherent capacity for creating a response based on a series of conditions, a more complete experience is obtained by the user. The interplay between play and machine may be termed interactive. Other examples that allow the user to interact with his or her machine and others are Internet related activities like online commerce or communication and online a game-playing. Game playing which utilizes information programs, corresponding to a plurality of processes or results from which a selection may be made from user response, are independently recorded on a disc along with corresponding picture information. The user then selects and reproduces a response from the disc by carrying out a random access search. Obviously the search and response must be substantially instantaneous. Yet another wrinkle to video gaming arises when games are played over the Internet with a mix of live and software generated characters.

With the communications revolution starting to reach most households and the desire for interactivity firmly rooted, such activities as surfing the Internet and visiting Web pages, home pages, or communicating over the Net, companies have identified startling strategic opportunities to promote their products. The major problem is to deliver the consumer to the Web site or home page. There are software programs that allow the consumer to browse through the net and if he so chooses stop at a Web-site. An even better method is to create a hot-link to the site, that is a software actuated procedure that automatically directs the consumer to the Web-site.

Given the fact that record companies produce millions of sound recordings in a CD format, there is a present desire to achieve multiple usages for the format. The prior art contains a multiplicity of enhanced CDs. The common feature, stands without exception that there is a provision for allowing the user to either listen or view and listen one or more pieces of audio or audio/video programming. In the alternative, there are CDs derived specifically for providing pre-programmed applications and/or utilities.

There is a tremendous amount of information relating to the compact disc and to a lesser extent digital video discs (hereinafter DVD and also known as digital versatile disc). The recording standards are set out and are uniformly adhered to in the industry. In fact, the compact disc is perhaps the most studied and regulated format within the recording industry. From the hub size, refractive index, ordering and physical characteristics of tracks, to the encoding and ordering of information or gaps the compact disc comports with an international standard commonly referred to as Red Book Standard. The video component of a compact disc recorded as a CD-ROM meets with a similar plurality of standards within the Yellow Book Standard.

The prior art as one might expect is rife with examples of enhanced compact discs. As an overall paradigm, there are embodiments that include methods and products for creating the disc and certain applications for creating a complex disc.

U.S. Patent 4,839,746 issued to Kanamura discloses a method for creating an enhanced CD that has both audio and audio/video sectors. The methodology limits the result to a bipartite product (audio and audio/video) without any further application functionality.

SUMMARY OF THE INVENTION

Accordingly, it is a general object of the present invention to provide a digital rotary recording medium with increased functional aspects.

It is yet another object of the present invention to provide a digital rotary recording medium capable of providing audio, video, application and browsing functions withon the same media.

Another and more specific object of the present invention is to provide a digital rotary recording medium on which information signals including an audio signal a video signal and at least another program capable of hot linking to Web pages and Web sites.

Still another object of the present invention is to provide an enhanced degree of cross-platform compatibility.

Yet another object of the present invention is to provide a digital rotary recording medium on which an audio section, an audio/video section and two or more programs reside and are switchable from one to another.

Still another object is to enable the user to interact with the Internet by an embedded browser or other application(s).

Another object of the present invention is to provide a system which is image, icon, touch, or voice driven.

A further object of the present invention is to provide a hot linking programming application to guide the user to a premeditated "Home Page" or "Web-Site" address on the Web.

Other objects and further features of the present invention will be apparent from the following detailed description when read in conjunction with the accompanying drawings.

DETAILED DESCRIPTION

Referring with more specificity to the drawings wherein like numbers refer to like parts throughout, set out below is the preferred embodiment for an enhanced digital rotary recording medium 12 in accordance with the present invention. While the preferred embodiment for digital rotary recording medium 12, will be described in terms of a compact disc (hereinafter CD) it should be understood that the invention specifically includes digital video discs (DVD) and other digital media capable of being recorded in an essentially rotary conformation. Further, enhanced digital rotary recording medium 12 is capable of operation in conjunction with an operating system like UNIX, DOS, OS/2, Mac System, Windows 3.1 and Windows 95 (Windows is a registered trademark of the Microsoft Corporation, Redmond, Wash.). For ease of explanation, the instant invention will be explained, but not limited to, a "windows" environment.

Figure 1:
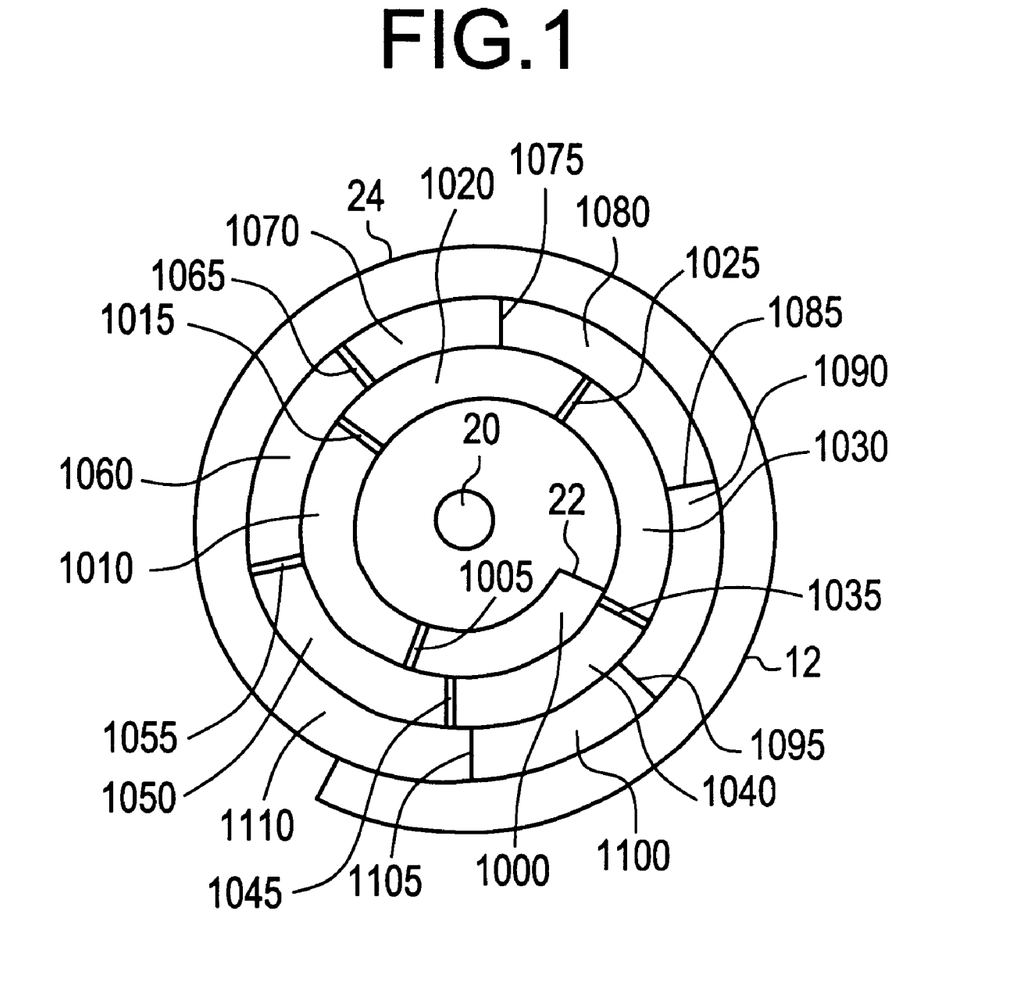
FIG. 1 is a top plan view taken as a systematic block diagram showing an embodiment of an enhanced digital rotary recording medium according to the present invention.
Figure 13:
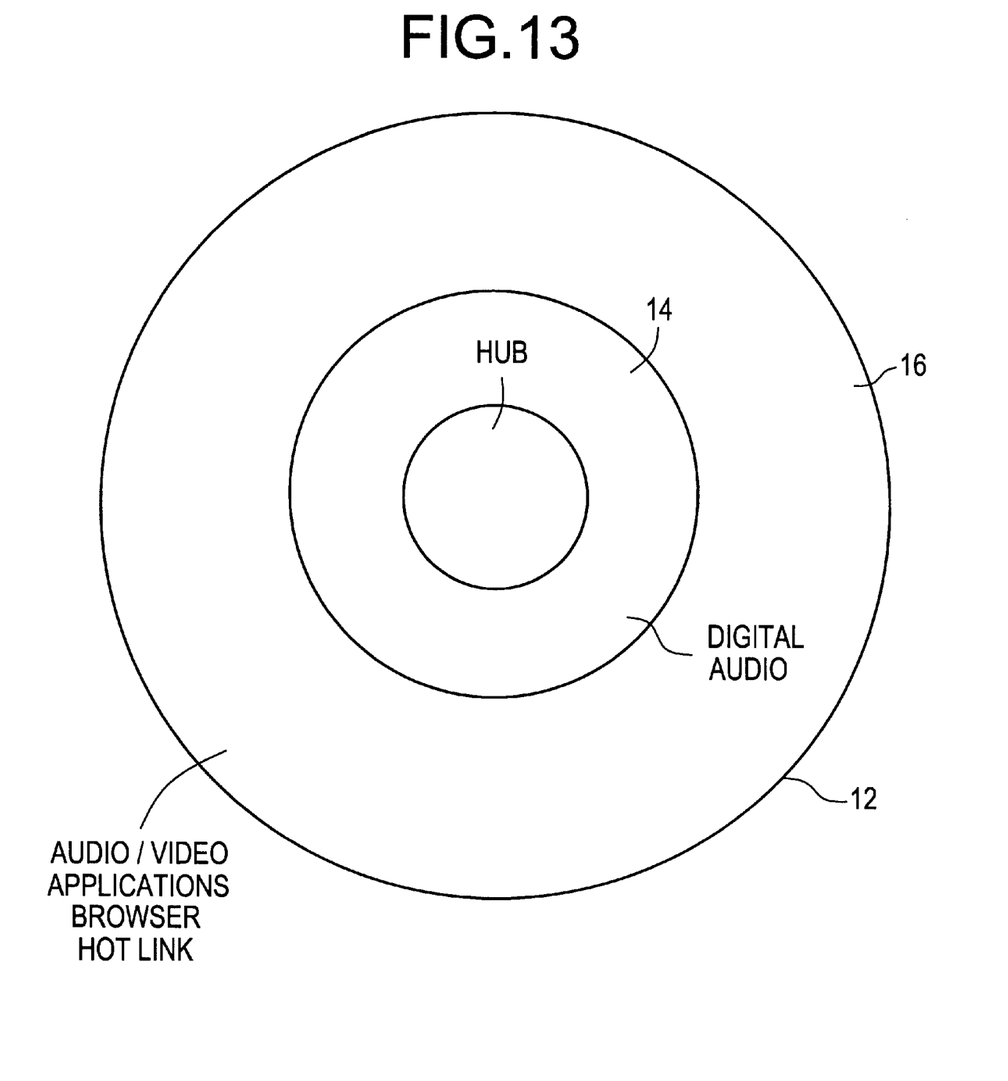
FIG. 13 is a schematic representation of an embodiment of an enhanced digital rotary recording medium in accordance with the present invention.

FIG. 13 shows a CD 12 in accordance with the present invention, said CD 12 is divided into at least two regions or sessions corresponding to the placement of data thereon, an audio region 14 and an audio/video data/application region bearing a plurality of files 16, said files containing disparate information and function. As stated hereinabove, the regions correspond to the session in which the data is encoded thereon, and will be described in terms of first session data and second session data. Turning to FIG. 1, the CD is divided into two areas: a first session area further comprising a series of digital audio data packets 1020–1060 and a second area further divided into areas of audio/video and data/application information 1090. For illustrative purposes, 1020–1060 shall refer to an audio selection like the one capable of being played on a standard compact disc player and having the basic Red Book characteristics. Digital audio selections may be recorded on the first 98 tracks, that is tracks 1–98 of CD 12. This information for the digital audio selection remains un-compressed and approximates the normal CD version of a musical selection. For example, the CD 12 may accommodate a recording arrangement of 13 musical selections, which can be played either by a compact disc player or through the PC via an interface provided by CD 12 and described hereinbelow.

Figure 6:
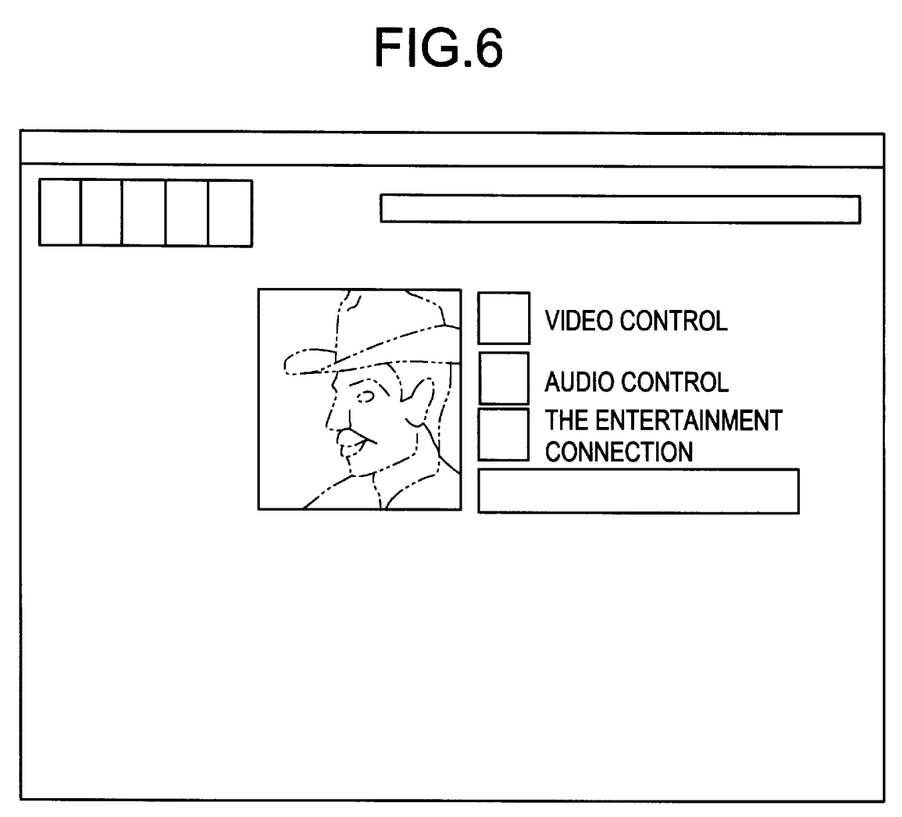
FIG. 6 is an example of the screen display of the initial screen showing the icon-based system in accordance therewith.

When one loads the CD into a multi-session CD-ROM drive and initiates the programs contained thereon, the user may access digital audio tracks 1–98 and the selections contained therein by an interface as illustrated by FIG. 6. The icon-based choice to the user is access one or more area, like the digital audio area. By clicking on the icon the interface instructs the PC (personal computer) to play the audio selections as if it were a compact disc player. The user can then continue with other work while the audio player plays the selection in the background.

By inserting the CD into a CD player, the digital audio tracks are accessed by number like a normal CD. Thus, the CD in accordance with the present invention may be used in existing hardware for both compact disc players and CD-ROM players.

Turning to FIG. 1, an audio/video selection 1090 resides within the session two area as a plurality of data/application files capable of being played on a CD-ROM player in combination with a personal computer. Audio/video component 1090 evolves as a second session and second region 16 of CD 12 pursuant to FIG. 13. The second session 1090 data application preferably has compressed digitized video information and un-compressed digital audio information in combination, yielding a file which may be termed an AVI (audio, video interleaved) file. The resulting audio video information and other data/application files are arranged in a hierarchial file system which is navigable by standard operating systems like DOS, UNIX, Mac System and Windows (Microsoft Corporation ®). There are three levels of correction situated withon session two.

As set out in FIG. 1, the rotary digital recording medium incorporates a series of 1–98 audio tracks (session one 1020–1060) and 1 data/application track (session two 1090). While session one digital audio is recorded in 2352 byte sectors, the audio visual and data/application files are recorded in 2048 byte sectors. The combination on CD 12 is therefore a mix of 2048 and 2352 byte sectors.

Figure 7:
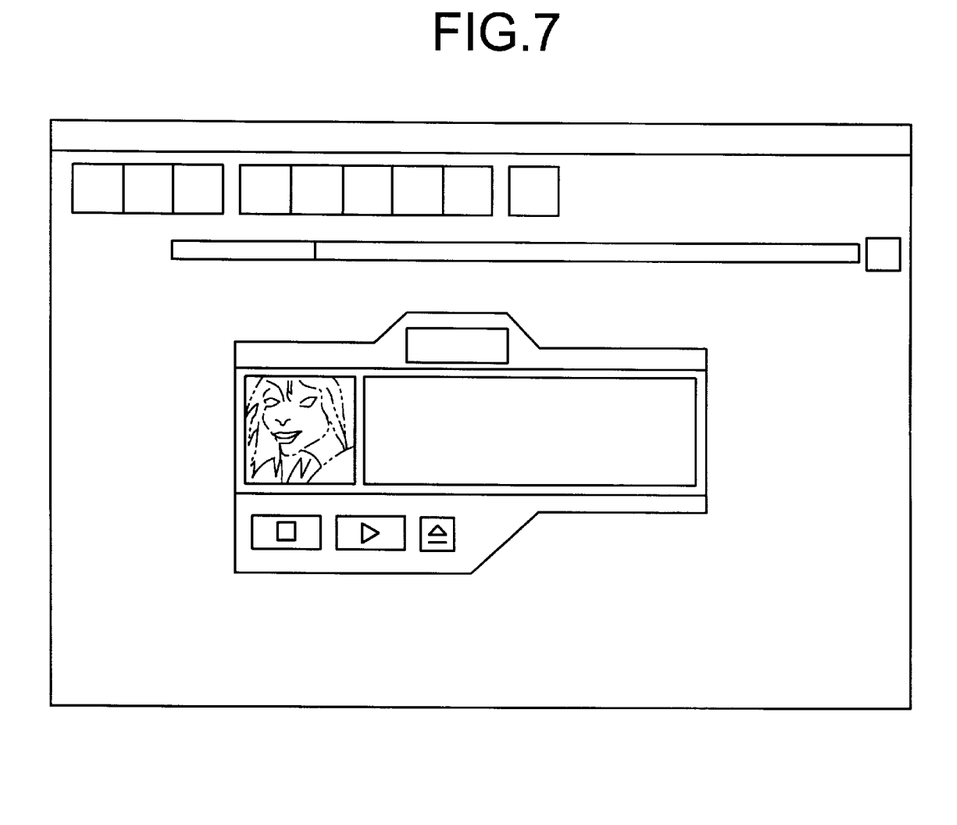
FIG. 7 is an example of the screen display of the initial screen showing the icon-based system for the audio segments in accordance therewith.
Figure 8:
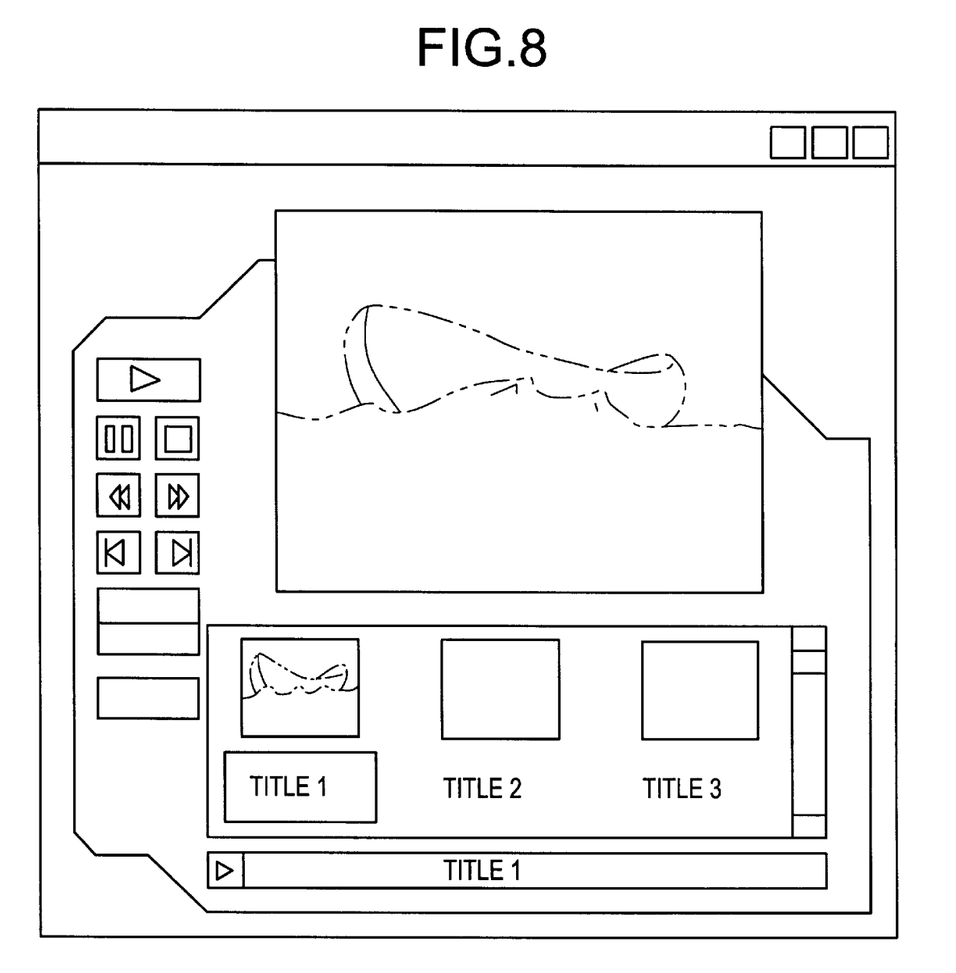
FIG. 8 is an example of the screen display of the initial screen showing the icon-based system for the audio/video segments in accordance therewith.
Figure 9:
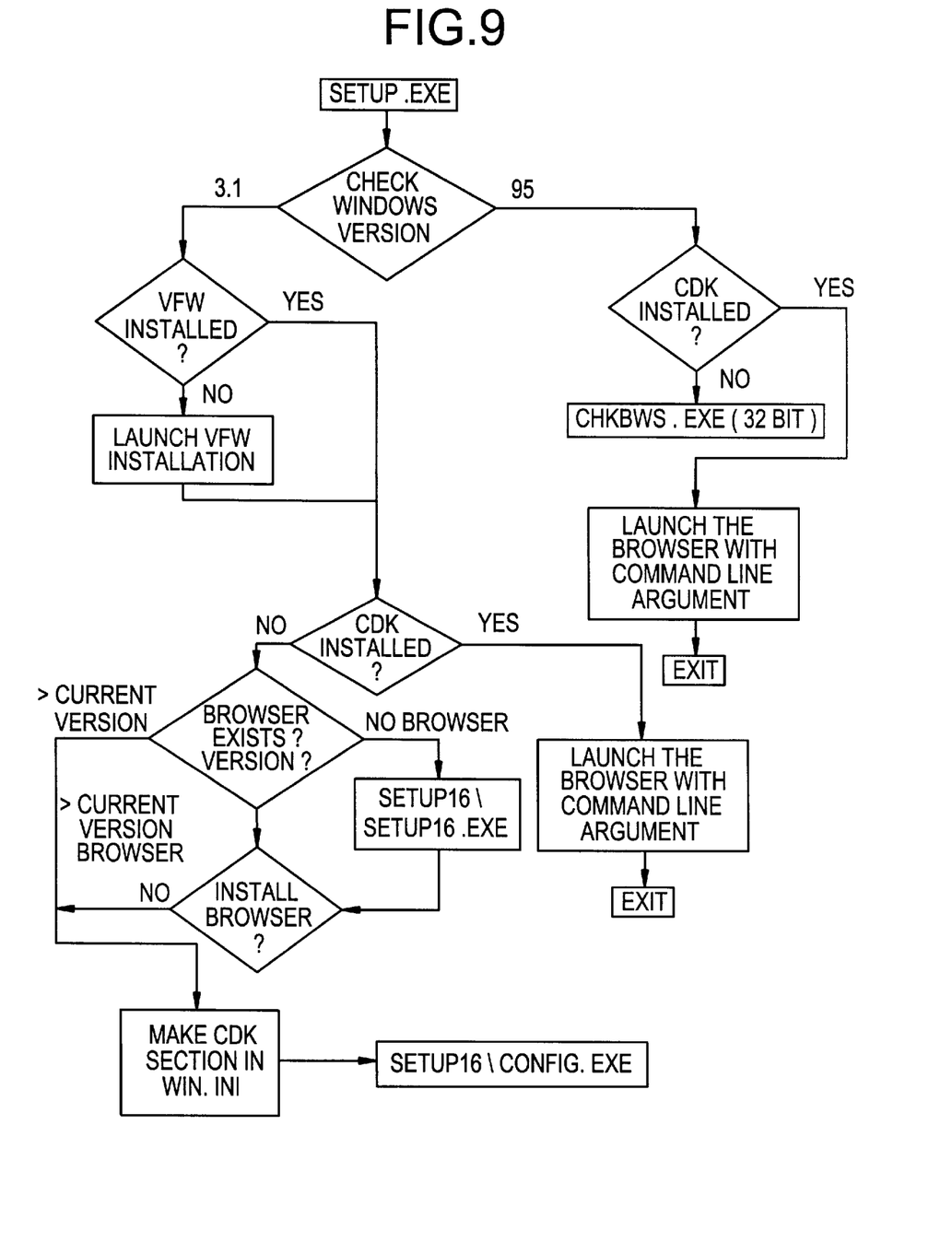
FIG. 9 is a flow chart of the programming commands in accordance therewith specifically outlining the installation protocol for the browser application.
Figure 10:
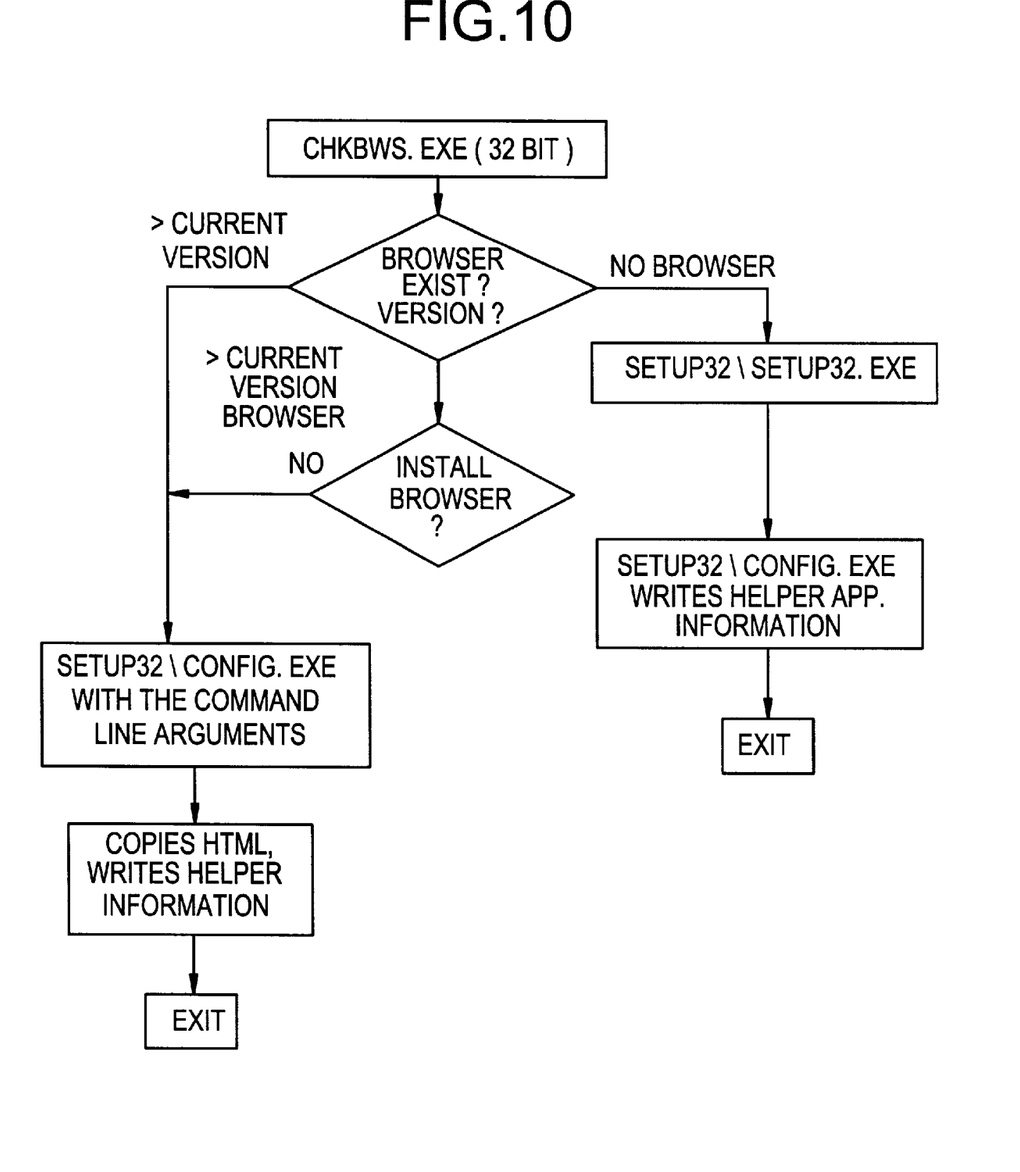
FIG. 10 is a flow chart of the programming commands in accordance therewith specifically outlining the installation protocol for the browser application.
Figure 11:
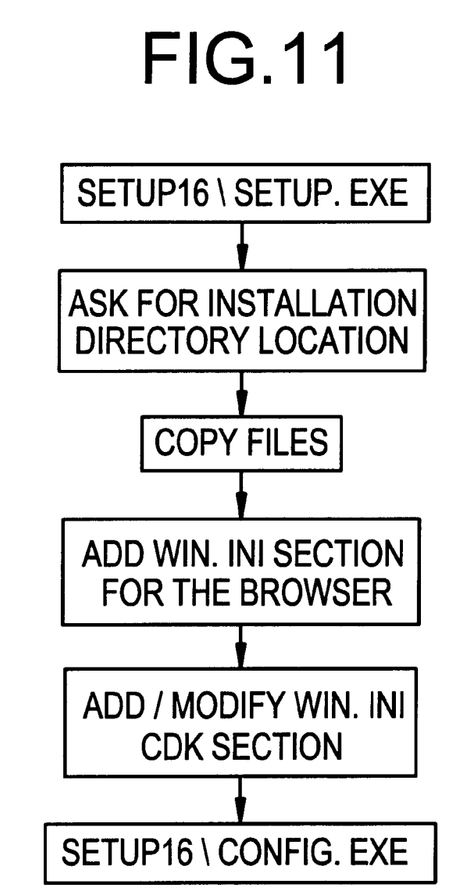
FIG. 11 is a flow chart of the programming commands in accordance therewith specifically outlining the installation protocol for the browser application.
Figure 12:
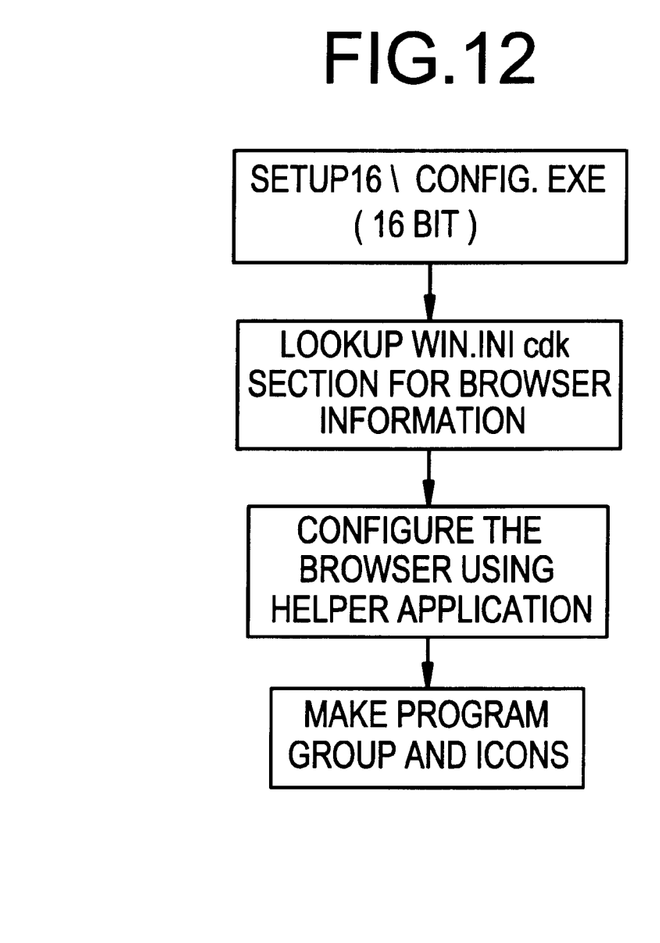
FIG. 12 is a flow chart of the programming commands in accordance therewith specifically outlining the installation protocol for the browser application.

The second session files 1090 also contains files preferably written in HTML (Hyper Text Markup Language) for an application selection comprised of one or more applications, residing therein, and further being described as a browser application in accordance with FIGS. 6, 7 and 8, or another application like a game playing or hot linking application. It should be noted that languages other than HTML like VRML or combinations of HTML and JAVA, VRML and JAVA, HTML and VRML, HTML and C++ generated code and the like may be operatively substituted. Further, such applications as set-up programs, execution programs, installation programs and video driver applications are located within the application section.

Figure 4:
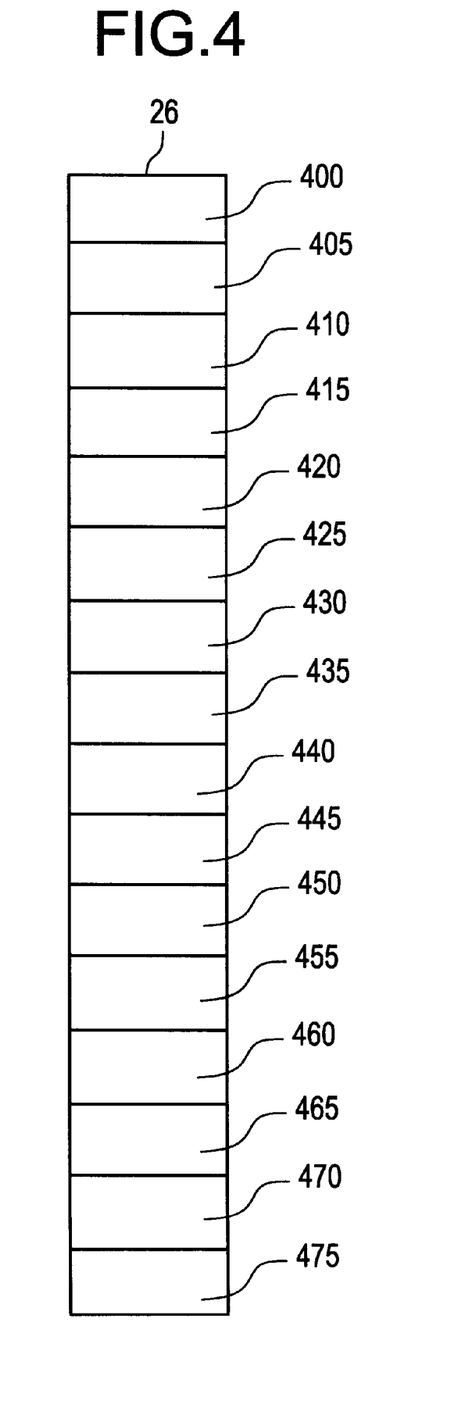
FIG. 4 is a schematic representation showing an embodiment of the file structure of an AVI file contained in session two thereof.

Turning now to FIG. 4, one of a plurality of files 1090 of FIG. 1, is structured as an AVI file, which is further constructed of one stream of digital audio information and one stream of compressed video information which is interleaved. The resulting audio/visual interleaved file provides both streams of information to the CPU (central processing unit) substantially instantaneously, resulting in audio/visual programming and enabling the user to view the program while at the same time listening to the synchronized soundtrack. The digitized material which may be derived from the capture of a music video from any format like Hi-8, Beta SP, D2 or VHS conforms in accordance with the following preferred parameters: video: image size=320× 240; format=composite NTSC; and frame rate=10 frames/ sec. The video component is compressed using a sampling rate to 10 frames/sec, with a data rate=200 kb/s. On the other hand the audio component remains un-compressed: audio (format=8 bits; Rate=11 Khz; Mode=mono). The results are a series of AVI (audio/video interleaved) files 22. Other kinds of compatible files include MPEG, MPEG-2, MMX, and other audio/video files which contain compressed audio and video files. Specifically, a MPEG-2 file contains compressed audio and video streams being operatively substituted in accordance with the present invention. While most video file types may be used it should be noted that AVI files (possessing an un-compressed digital audio stream and a compressed video stream) are currently preferred based on CPU processing power.

Figure 3:
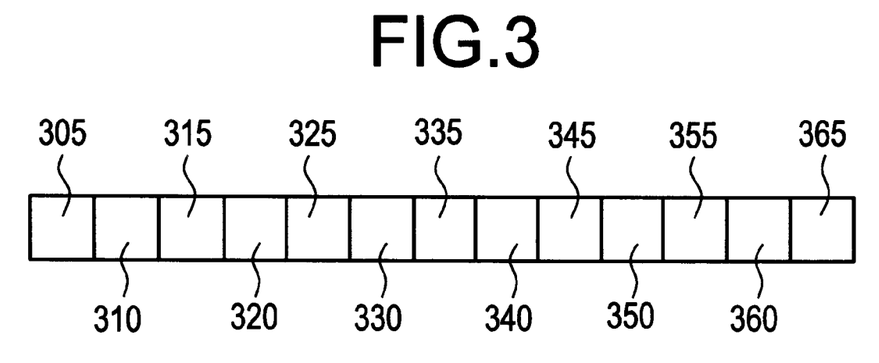
FIG. 3 is a schematic representation showing a preferred embodiment of the file hierarchy of the data contained in session two thereof.

FIGS. 6, 7 and 8 show browser component and its relative address being located within preferably within HTML sector 340, of FIG. 3 within data/application files 1090 of FIG. 1. A browser is an application loaded with the video component and specifically allows the user to interact with or "surf" the Web. Simply, a browser provides the user with a navigation tool for access to the various areas on the Internet as well as on the CD 12 in accordance with the present invention.

Within data/application area, 1090 of session two, and more specifically in the set-up program, and in accordance with FIGS. 9,10,11, and 12 a browser application will be installed on the PC in which the CD 12 is resident. As set out in more detail in FIG. 9 the set-up program of CD 12 will first ascertain whether a browser application exists. If there is no browser application loaded on the system, the setup program of CD 12 will load the browser application which is resident on CD 12, and will load a compatible version in either 16 bit or 32 bit configurations. Once the browser application is loaded, it will allow the user to browse the Internet and CD applications via a screen-based icon choice. Screen interaction may be achieved by the user's interaction with a mouse-type pointing device and icon selection, titled icon, touch-driven by use of certain areas of the screen, by a voice-driven system, or other conventional selection means.

Another utility resides within this functional group, a "hot link" embedded within the browser application or its default HTML providing yet another application or program. A direct access to a pre-defined home page or Web-site address furnishes the user with immediate passage to the home page or Web-site of the recording artist, film or record company and/or online marketer.

Within session two and more specifically as depicted in FIGS. 9, 10, 11 and 12 CD 12 will search for video and other drivers 365 of FIG. 3, compatible to play AVI files. When used in a 16 bit or 32 bit Windows® environment with Windows® installed video drivers the AVI file 305–320 of FIG. 3 (audio/video interleaved file) a mix of digital audio and compressed video information is played as if the information is read simultaneously. Both streams of information are played substantially instantaneously and the compressed video information is essentially decompressed on the fly so that it can be played in synchronous relation with the digital audio information. The result is an audio visual program like a music video where the sound is synchronized with the picture. Prior art examples have usually suffered from degraded visuals or out of synchronization audio components. It should be noted that the present invention, when used in a Windows ® environment, will write to the WIN.INI file to facilitate play-back of the AVI files unless the auto-run feature of Windows 95® is currently running.

With respect to FIG. 1, inner margin 22 of hub 20 the overall tracking structure is as follows: optional power calibration and program memory area 1000, and optional corresponding gap 1005, lead-in information for the audio portion 1010, gap 1015, first audio track 1020, gap 1025, second audio track 1030, gap 1035, intermediate audio tracks 1040, gap 1045, penultimate audio track 1050, gap 1055, ultimate audio track 1060, gap 1065, lead-out for audio 1070, optional link between digital lead out and second session lead-in 1075, second session lead-in 1080, a no-gap interface between second session lead-in and data files 1085, data/application files 1090, no gap interface between data/application files and second session lead out 1095, second session lead out 1100, and terminal portion of the CD 1110.

Returning to FIG. 1 and 13 which illustrate the overall architecture of CD 12 in accordance with the present invention. From the two major areas of session one 14 data and session two 16 data the recording medium is divided as set out below. Optional power calibration area and memory area 1000, conforms to Orange Book Standard, which standardizes the recording rate and placement of data onto CD 12.

Second session 16 in accordance with FIG. 13 starts with optional link area 1075 followed by lead-in 2 1080. All data/application files 1090 follow without gaps until lead-out 2 1100 ends session two. The edge 24 of CD 12 presents the outermost physical boundary and is without recording media.

In accordance with FIG. 2 one embodiment, data/ application files 1090 contain a file order for the second session as follows: setup and video driver files 205, AVI file 210, reference file 215, AVI file 220, reference file 225, AVI file 230, reference file 235, AVI file 240, reference file 245, AVI file 250, reference file 255 and application files 260 (execution files, configuration files and Hyper Text Markup Language) (HTML) files and browser 265. This protocol groups the data and reference files in an alternating order of data and reference. Furthermore, the video driver and application files appear at the both front and rear of the session 2 area.

In accordance with the present invention and particularly with reference to FIG. 3, the preferred embodiment for the ordering of session 2 files 1090 groups all AVI files together, all reference files together and all application files together. The preferred ordering is in direct contravention to the alternate ordering set out above. The preferred order, as portrayed by FIG. 3 groups all AVI files 305, 310, 315, 320 in one group immediately at the beginning of session 2 at address 0, all reference files 325, 330, 335, 340 immediately following the AVI files and all applications files thereafter HTML, 340 execution files 345, configuration files 350, installation files 355, setup files 360, followed by video driver files 365.

In both embodiments there are a like number of data and reference files, the data or AVI files containing the audio/visual information and the reference files comprising a database and other information relating to each part of the data file. For example, if the data file contains a music video, the corresponding reference file will provide the following information: artist, record company, producer, label, poster frame with the instruction that the frame will appear at the initiation of the playing of the file. The preferred ordering is a clear deviation from the first embodiment (alternating structure) which might be conceived as the standard. By grouping the AVI files composed of compressed and un-compressed audio video information, followed by all reference files and finally the application and browser files head seek time is substantially reduced which increases the quality of the audio/video program selection.

Referring to FIG. 4 one can clearly ascertain the structure of an AVI file 26. AVI file 26 contains file header 400 which contains information on the size of the file, the rate at which it is to be played, total frames, the height and width of the frames and a reserved area. Video stream header 405 contains the compression algorithm for compression of the video while audio stream header 410 appertains to start/end points and size of the digital audio component. Audio one 415 follows audio stream header 410, with a succession of audio files: Audio two 420; Audio three 425; Audio four 430; Audio five 435; Audio six 440; and Audio seven 445. Video one 450 succeeds Audio seven 445 which is followed by Audio eight 455 which in turn is followed by Video two 460, then Audio nine 465 and Video three 470. From this point on compressed video alternates with non-compressed audio. Index Chunks 475 conclude AVI 26, said Index Chunks 475 being either relegated to a look-up table or remaining dormant and unused.

As described by FIGS. 9–12 the session two install program checks the files and disc space on the hard drive of a PC and if the PC lacks the appropriate files, creates a directory and copies any necessary browser or other applications like an audio or video player to said directory. A cache is then created in a cache directory for use by the browser and for storing HTML pages. The hot-link information is stored within the HTML pages. Set-up application according to FIGS. 9–12 of session two executes browser so that the default HTML page is displayed as illustrated by FIG. 6. HTML pages include the links necessary to execute the audio, audio/video or browsing applications. This gives rise to the "clickable" icon-based method for using CD 12. Hence, it is through HTML pages that both Internet browsing and browsing within the CD 12 is effected. A browser may be defined as an application or program designed to undertake the sequential search through a target directory. For purposes of the present invention, browser includes both intranet and internet applications.

Therefore, on a macro level, data/application files 1090 of second session 16 are located at a relative address 00 which directly follows first session 14 digital audio information. Data/application files 1090 reside in essentially a position circumferentially peripheral to the digital audio files 14 of CD 12, with a grouping of the reference files along side.

Figure 2:
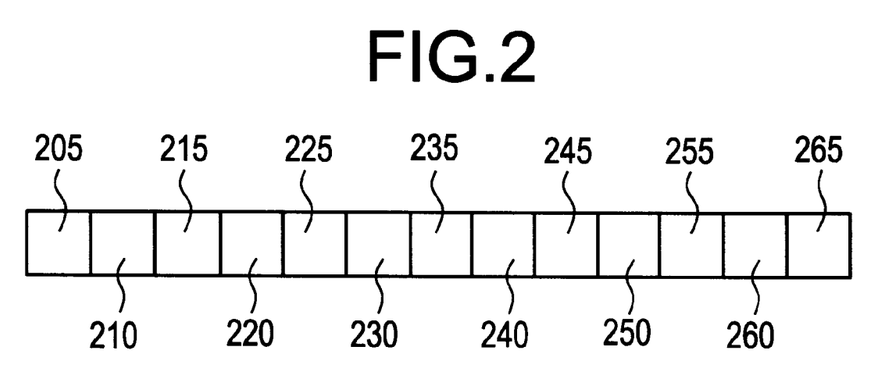
FIG. 2 is a schematic representation showing one embodiment of the file hierarchy of the data contained in session two thereof.
Figure 5:
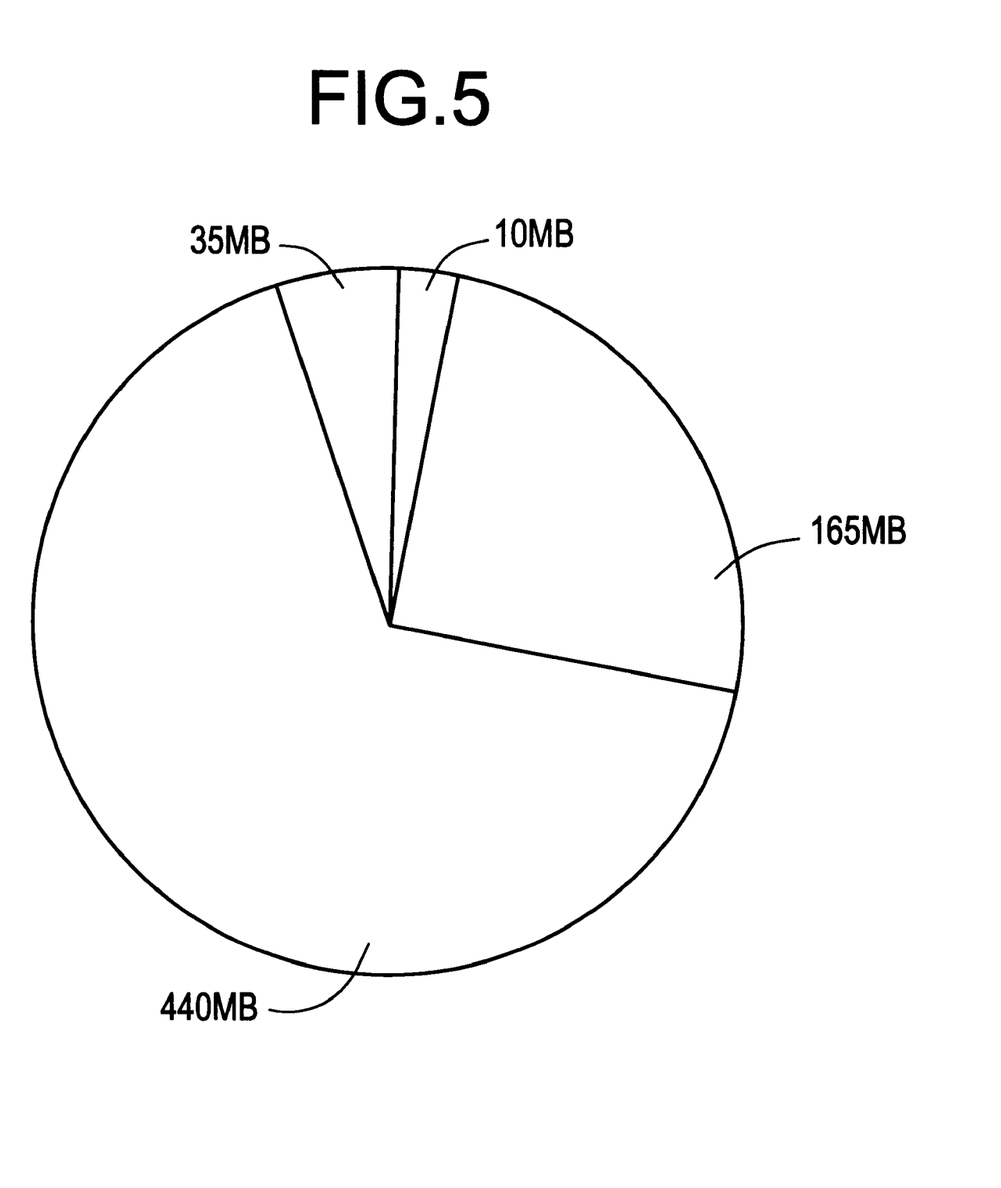
FIG. 5 is a schematic representation of the relative amounts of information in the several parts in a CD in accordance therewith.

Turning to FIGS. 1, 2 and 5 a description will be given with respect to the overall structure of CD 12 and the relative placement or address withon the recording medium. The disc in accordance with the present invention contains up to about 650 Mbytes and is divided, as heretofore described into two overall areas, a digital audio area and a data area. In accordance with FIG. 5, a preferred embodiment in accordance with the present invention a number of areas and approximate relative sizes follow: Overhead (35 Mbytes); Audio/Video Interleaved Files (165 Mbytes); Applications (10 Mbytes); and Digital Audio (440 Mbytes). As one can see the bulk of the data, the Digital Audio component is contained in first session 14. Since the size of each of the areas may vary, the only address that remains constant is the address 0 of first session 14 and 00 of second session 16. Accordingly, when CD 12 in its preferred embodiment physically presents a track gap configuration in first session 14 digital audio area, but omits the use of gaps in the second session 16 data areas.

Overhead areas 1010, 1070, 1080, 1100 of sessions one and two, in accordance with FIG. 1, contain lead in files and lead-out files, which are normally written after the writing of session two to a staging area is complete. These files are responsible for starting addresses for each track, being written into the "lead-in" and providing a table of contents with address, title of track, producer, company or other information while the "lead out" area is of approximately 2.5 minutes at the end of CD 12 abutting edge 22 of CD 12. The overhead areas are of about 35 Mbytes in a preferred embodiment.

Therefore, there may be a maximum number of programs (audio, audio/video, applications) which may be recorded on CD 12 in accordance with the present invention. The equation for arriving at the maximum number of minutes of video that can be stored in the second session of CD 12 is described by the following equation.

$$v = ((C-a)\gamma) - \Omega$$

where v is the length of video in minutes, C is the total disc capacity in minutes, a is the length of digital audio in the first session, γ is the ratio of audio sampling rate in Mbytes per minute to the average video sampling rate in Mbytes per minute and Ω is the sum of the lead-in, lead-out, data and application files.

EXAMPLE

Using a total disc capacity of C=74 minutes, and a total audio program of 50 minutes a=50 minutes, and assuming an audio sampling rate of 10.5 Mbytes per minute and an average video sampling rate of 7.0 Mbytes per minute which yield a γ value of 1.5 and a total lead-in/lead-out time of four minutes, as well as 20 Mbytes of other data and application files which is the equivalent of about 2.3 minutes or an Ω value 6.3 minutes. Inserting these values into the above stated equation:

$$v = ((74-50)1.5) - 6.3$$

$$v = 29.7 \text{ minutes}$$

Thus, CD 12 will have a video capacity of about 29 minutes.

Description was given heretofore with respect to cases where the present invention is applied to a compact disc but the instant invention appertains to other rotary digital formats including digital video discs. Notwithstanding its greater storage capacity the basic structure and file hierarchy would be the same.

According to the present invention, with reference to FIGS. 6, 7 and 8 switching from one utility to another or from one screen to another can be performed instantaneously by using a icon or icon-based screen function. Simply, the user manipulates a pointer by using a pointing device like a mouse to the appropriate screen area and clicks on the screen area. The selection of audio, audio/video, browsing and "hot-linking" is initiated through this process.

While the invention has been particularly described in connection with specific embodiments thereof, it is to be understood that this is by way of illustration and not of limitation, and that the scope of the appended claims should be construed as broadly as the prior art will permit.

What is claimed is:

1. A digitally encoded recording medium comprising a recording medium having encoded thereon audio data for independent or interactive playback, audio-video data for independent and interactive playback, program data providing interactive execution of at least on digitally encoded application and playback of at least one of said audio data and said audio-video data, wherein the at least one application comprises digitally encoded Internet browser program and the program data comprises an interface to the Internet browser program, the interface linking the audio data and the audio-video data to the Internet browser program so as to permit interactive execution of the Internet browser program and playback of at least one of the audio data and the audio-video data.

2. The digitally encoded recording medium according to claim 1, wherein said internet browser program is external to said recording medium.

3. A digitally encoded recording medium comprising a recording medium having digitally encoded thereon digital audio information defining a first session and digital information defining a second session, wherein said second session information contains digital audio-video data in an audio-video file, digital reference data in at least one reference file, and program data in an application file, and wherein said program data provides interactive execution of a digitally encoded internet browser program with playback of said audio information in said first session and playback of said audio-video in said second session.

4. The digitally encoded recording medium according to claim 3, wherein said internet browser program is external to said recording medium.

5. The digitally encoded recording medium according to claim 3, wherein said second session audio-video files are audio-video interleaved files.

6. The digitally encoded recording medium according to claim 5, wherein said second session audio-video interleaved files are grouped together.

7. The digitally encoded recording medium according to claim 3, wherein said second session application file includes at least one of the following set-up files, installation files, audio and video player files, browser files, hot linking files, and HTML files.

8. The digitally encoded recording medium according to claim 3, wherein said at least one data file in said second session includes a reference file.

9. The digitally encoded recording medium according to claim 3, wherein said second session at least one reference file comprises reference data in a plurality of reference files which are grouped together.

10. The digitally encoded recording medium according to claim 3, wherein said digital audio information is stored in 2352 byte sectors.

11. The digitally encoded recording medium according to claim 3, wherein said audio-video data is stored in 2048 byte sectors.

12. The digitally encoded recording medium according to claim 3, wherein said second session includes audio-video interleaved files and reference files, arranged in an alternating configuration such that for every audio-video interleaved file there is a corresponding reference file adjacent thereto.

13. The digitally encoded recording medium according to claim 3, wherein said first session comprises up to 98 tracks in a gap and track configuration and said second session has no gaps.

14. The digitally encoded recording medium according to claim 3, wherein said audio data defines at least one musical recording.

15. The digitally encoded recording medium according to claim 3, wherein said audio data defines a compilation of musical recordings.

16. The digitally encoded recording medium according to claim 3, wherein said audio-video data defines at least a portion of a musical video.

17. The digitally encoded recording medium according to claim 3, wherein said recording medium comprises a compact disc.

18. The digitally encoded recording medium according to claim 3, wherein said recording medium comprises a digital versatile disc.

19. A digitally encoded recording medium comprising:
  an audio encoded portion having encoded therein digital audio data in a format for playback on single session or multiple session playback devices;
  an audio-video encoded portion having encoded therein interleaved digital audio and video data in a format for playback on single session or multiple session playback devices; and
  at least one application encoded portion having encoded therein program data in a form for execution on multiple session devices, said program data facilitates interactive playback of said audio data or said audio-video data when a digitally encoded internet browser program is running.

20. The digitally encoded recording medium according to claim 19, wherein said internet browser program is external to said recording medium.

21. The digitally encoded recording medium according to claim 19, wherein said digital audio data defines at least one musical recording.

22. The digitally encoded recording medium according to claim 19, wherein said digital audio data defines a compilation of musical recordings.

23. The digitally encoded recording medium according to claim 19, wherein said digital audio-video data defines at least a portion of a musical video.

24. The data digitally encoded recording medium according to claim 19, wherein said program data comprises an interface to an internet browser program, said interface linking said audio encoded portion and said audio-video encoded portion to said internet browser so as to permit said interactive execution of said internet browser program and playback of at least one of said audio data in audio encoded portion and said audio-video data in said audio-video encoded portion.

25. A digitally encoded recording medium, comprising:
  audio data encoded on an audio portion of a recording medium, said audio data being encoded in a format for playback on single session and multiple session devices;

audio-video data encoded on an audio-video portion of the recording medium, said audio-video data being encoded in a format for playback on single session and multiple session playback devices; and an application portion configured to interact with an internet browser program to permit playback of said audio data or said audio-video data from said internet browser program and to permit running a second application program from said internet browser program.

26. A digitally encoded recording medium comprising:

an audio data portion having encoded therein audio data formatted for playback on single session and multiple session playback devices; and an application portion having encoded therein program data that facilitates playback of the audio data while an application program is running such that while the application program is running a user can initiate playback of the audio data without having to terminate execution of the application program, wherein the application program comprises an Internet browser program and the Internet browser program is encoded on the recording medium.

27. A digitally encoded recording medium, comprising:

audio data encoded on an audio portion of a recording medium, said audio data being encoded in a format for playback on single session and multiple session devices;

audio-video data encoded on an audio-video portion of the recording medium, said audio-video data being encoded in a format for playback on single session and multiple session playback devices; and an internet browser program encoded on an application portion of the recording medium, said internet browser program being encoded in a format for playback on multiple session playback devices.

28. An interactive audio-video operating system comprising:

a digitally encoded recording medium having encoded thereon audio data for independent or interactive playback, audio-video data for independent and interactive playback, program data providing interactive execution of at least one application and playback of at least one of the audio data and the audio-video data; and a computer for executing the program data that provides interactive execution of the at least one application and playback of the at least one of the audio data and the audio-video data wherein the at least one application comprises an Internet browser program and the program data comprises an interface to the Internet browser program, the interface linking the audio data and the audio-video data to the Internet browser program so as to permit interactive execution of the Internet browser program and playback of at least one of the audio data and the audio-video data.

* * * * *